(12) United States Patent
Kuriyama et al.

(10) Patent No.: US 12,224,093 B2
(45) Date of Patent: Feb. 11, 2025

(54) MULTILAYER MAGNETIC SHEET

(71) Applicant: PROTERIAL, LTD., Tokyo (JP)

(72) Inventors: Yasuo Kuriyama, Tokyo (JP); Kouhei Miyano, Tokyo (JP); Yuichi Ogawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/295,561

(22) Filed: Apr. 4, 2023

(65) Prior Publication Data

US 2023/0326639 A1   Oct. 12, 2023

(30) Foreign Application Priority Data

Apr. 8, 2022   (JP) ................. 2022-064700

(51) Int. Cl.
*H01F 1/16* (2006.01)
*B32B 7/12* (2006.01)
*B32B 15/01* (2006.01)

(52) U.S. Cl.
CPC ............. *H01F 1/16* (2013.01); *B32B 7/12* (2013.01); *B32B 15/011* (2013.01); *B32B 2307/208* (2013.01)

(58) Field of Classification Search
CPC ....... B32B 7/03; B32B 2307/208; B32B 7/12; H01F 1/16
See application file for complete search history.

(56) References Cited

U.S. PATENT DOCUMENTS

| | | |
|---|---|---|
| 2007/0040643 A1 | 2/2007 | Inoue et al. |
| 2015/0123604 A1 | 5/2015 | Lee et al. |
| 2019/0027302 A1 | 1/2019 | Noh et al. |
| 2019/0296432 A1 | 9/2019 | Lim et al. |
| 2022/0293313 A1 | 9/2022 | Kuriyama |
| 2022/0298593 A1 | 9/2022 | Kuriyama |

FOREIGN PATENT DOCUMENTS

| | | |
|---|---|---|
| CN | 209087527 U | 7/2019 |
| JP | 2008112830 A | 5/2008 |

OTHER PUBLICATIONS

Extended European Search Report issued in EP application No. 23159405.2-1212; dated Aug. 25, 2023; 13 pages.

*Primary Examiner* — Adam Krupicka
(74) *Attorney, Agent, or Firm* — Meunier Carlin & Curfman LLC (57) ABSTRACT

A multilayer magnetic sheet includes at least one first layer in which a plurality of magnetic strips are arranged side by side; at least one second layer in which the plurality of magnetic strips are arranged side by side, a direction of the long side of the at least one second layer intersecting that of the at least one first layer; and at least one third layer in which the plurality of magnetic strips are arranged side by side, a direction of the long side of the at least one third layer being the same as that of the at least one first layer. A position of the long side in the at least one first layer and a position of the long side in the at least one third layer are separated from each other by 0.5 mm or more in a direction in which the short side extends.

9 Claims, 10 Drawing Sheets

MULTILAYER MAGNETIC SHEET

CROSS-REFERENCE TO RELATED APPLICATIONS

The present application claims priority based on Japanese Patent Application No. 2022-064700 filed to the Japanese Patent Office on Apr. 8, 2022, and the content of Japanese Patent Application No. 2022-064700 is incorporated by reference in its entirety.

BACKGROUND

The present disclosure relates to a multilayer magnetic sheet that can be used in, for example, a contactless charging device for charging a secondary battery of an automobile.

In recent years, attention has been given on contactless charging in which a transmission coil is provided on each of a power feeder and a power receiver and charging is performed by power transmission using electromagnetic induction. In the contactless charging, magnetic flux generated in a primary transmission coil of a power feeder passes through housings of the power feeder and the power receiver, and generates electromotive force in a secondary transmission coil of a power receiver, whereby power is supplied.

The contactless charging has been spreading to electronic devices such as a tablet-type information terminal, a music player, a smartphone, a mobile phone, or the like. The contactless charging is a technique applicable to electronic devices other than the devices described above, electric automobiles, and drones. Furthermore, the contactless charging is a technique also applicable to a transport vehicle such as a forklift and an automated guided vehicle (AGV), a railway, a tram, and the like.

In order to increase power transmission efficiency in contactless charging, a magnetic sheet may be installed as a coil yoke on the transmission coil on the side opposite to the contact surface between the power feeder and the power receiver. The magnetic sheet disposed in this manner has a role as a magnetic shielding material for preventing leakage of magnetic flux during charging, a role as a yoke member for refluxing magnetic flux generated in a coil during charging, or the like.

As a method for manufacturing the magnetic sheet described above, various methods have been proposed (e.g., see Japanese Unexamined Patent Application Publication No. 2008-112830 (Patent Document 1), Japanese Unexamined Patent Application Publication (Translation of PCT Application) No. 2015-505166 (Patent Document 2), and WO 2020/235642 (Patent Document 3)). Each of Patent Documents 1 to 3 discloses a manufacturing method including a step of dividing a thin sheet-shaped magnetic body included in a magnetic sheet, a ribbon of an amorphous alloy or a nanocrystalline grain alloy, or the like (hereinafter referred to also as a "magnetic strip") into a plurality of pieces for the purpose of improving a quality (Q) factor or reducing an eddy current loss.

In the case of contactless charging used in an electric automobile or the like, in comparison with an electronic device such as a smartphone, it is difficult to dispose a primary coil and a secondary coil close to each other. For example, the primary coil and the secondary coil need to be electromagnetically coupled in a state where an interval therebetween is wide.

In addition, power transmitted between the primary coil and the secondary coil also needs to be increased as compared with a case where they are used in an electronic device such as a smartphone. Specifically, a current allowed to flow through the primary coil also becomes large, and the magnetic flux between the primary coil and the secondary coil also needs to be increased.

Thus, the primary coil and the secondary coil become large, and there is a problem in that a magnetic sheet used for an electronic device such as a smartphone is insufficient in size. Furthermore, since the magnetic flux becomes large, there is a problem in that the magnetic flux tends to easily leak to other devices.

The magnetic strip included in the magnetic sheet has a shape extending in a band shape. There is a problem in that the width of the magnetic strip, which is a dimension in a direction orthogonal to the longitudinal direction, is narrow for contactless charging used in electric automobiles and the like.

In contrast, there is also known a technique of arranging a plurality of magnetic strips in a plate shape and further stacking the plurality of magnetic strips arranged in a plate shape in a thickness direction (e.g., see Japanese Unexamined Patent Application Publication (Translation of PCT Application) No. 2019-522355 (Patent Document 4)). In the technique described in Patent Document 4, the width of the surface on which the magnetic strips is disposed is easily widened.

SUMMARY

The technique described in Patent Document 4 is a method of stacking single-layer magnetic strips.

Patent Document 4 discloses a mode in which ribbon sheets of a plurality of nanocrystalline grain alloys are arrayed in an m×n matrix structure, and FIG. 10 of Patent Document 4 discloses a mode in which a plurality of divided sheets are arranged in different directions.

For example, it has been found that a magnetic sheet for contactless charging used for an electric automobile or the like needs to be formed in more layers and also needs to be formed side by side in a lateral direction, as compared with a magnetic sheet for an electronic device such as a mobile phone.

Figure 13:
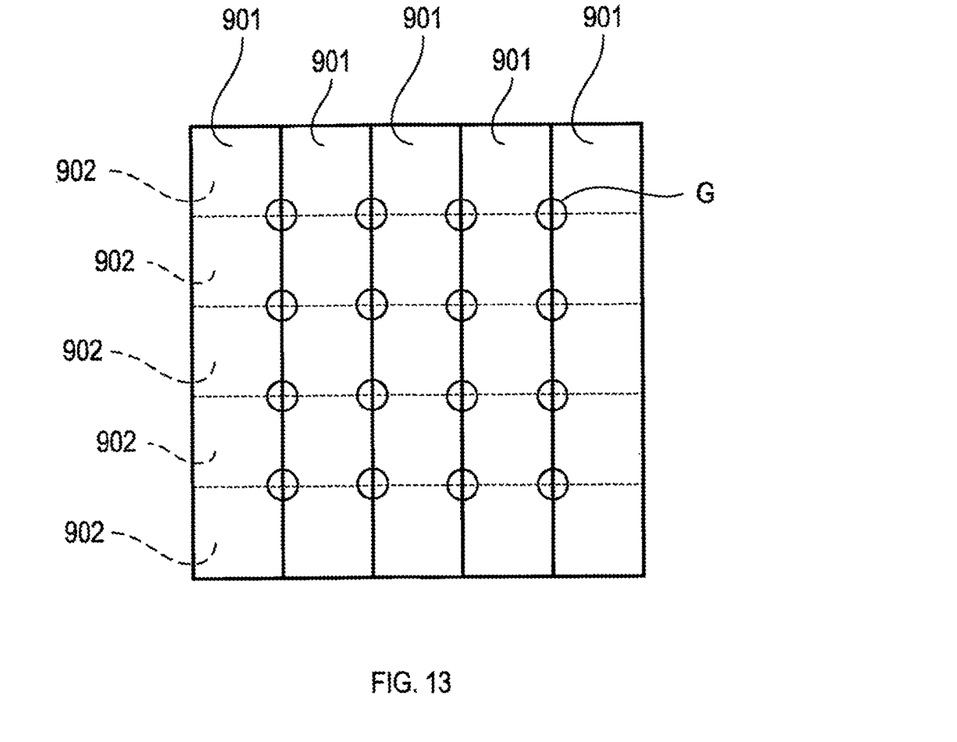
FIG. 13 is a plan view for explaining a structure of a conventional technique.

In the review of the configuration of the multilayer magnetic sheet, it has been found that arranging in different directions disclosed in Patent Document 4 also serves as one means. Then, when the magnetic strips are to be vertically stacked with respect to the laterally arranged magnetic strips, the magnetic strips were arranged in different directions. A conceptual view thereof is shown in FIG. 13. FIG. 13 is a plan view in which a plurality of magnetic strips 901 that are long in the vertical direction are arranged side by side in the uppermost layer, and a plurality of magnetic strips 902, whose direction has been changed, are arranged side by side in the lower layer. When this configuration was prototyped, expected characteristics were not obtained.

The present disclosure provides a multilayer magnetic sheet having good magnetic characteristics.

In the multilayer magnetic sheet shown in FIG. 13, the reason why expected characteristics cannot be obtained was examined. Then, attention is given to a portion indicated by a circle G in FIG. 13 in a configuration in which the plurality of magnetic strips 901 and the plurality of magnetic strips 902 are stacked in different directions. The portion indicated by the circle G is a portion where the interval between the magnetic strips is continuously generated in the stacking direction. As described above, it has been found that when the interval (also referred to as a magnetic gap) between the magnetic strips occurs continuously in the stacking direction, the magnetic permeability of the multilayer magnetic sheet decreases and the Q factor decreases. Therefore, a configuration in which the magnetic gap is not continuously formed in the stacking direction of the magnetic strips has been reviewed, and the configuration of the present disclosure has been found.

A multilayer magnetic sheet according to an aspect of the present disclosure includes: at least one first layer in which a plurality of magnetic strips each formed in a band shape having a short side and a long side are arranged such that the long sides are adjacent to each other to be arranged in a plate shape;
    at least one second layer in which the plurality of magnetic strips are arranged such that the long sides are adjacent to each other to be arranged in a plate shape, a direction in which the long sides of the at least one second layer extend intersecting a direction in which the long sides of the at least one first layer extend; and
    at least one third layer in which the plurality of magnetic strips are arranged such that the long sides are adjacent to each other to be arranged in a plate shape, a direction in which the long sides of the at least one third layer extend being the same as a direction in which the long sides of the at least one first layer extend; where
a position of the long side in the at least one first layer and a position of the long side in the at least one third layer are separated from each other by 0.5 mm or more in a direction in which the short side extends.

Furthermore, the multilayer magnetic sheet according to an aspect of the present disclosure further includes at least one fourth layer in which the plurality of magnetic strips are arranged such that the long sides are adjacent to each other to be in a plate shape, a direction in which the long side of the at least one fourth layer extends being the same as a direction in which the long side of the at least one second layer extends; where a position of the long side in the at least one second layer and a position of the long side in the at least one fourth layer are separated from each other by 0.5 mm or more in a direction in which the short side extends.

According to the multilayer magnetic sheet of the present disclosure, the magnetic gaps continuous in the stacking direction of the magnetic strips can be suppressed from being formed, and hence the deterioration of magnetic characteristics in the multilayer magnetic sheet is prevented, and a multilayer magnetic sheet with a high magnetic permeability and a high Q factor can be easily obtained.

The multilayer magnetic sheet of the present disclosure has effects that the magnetic gaps continuous in the stacking direction of the magnetic strips can be suppressed from being formed, and a multilayer magnetic sheet having satisfactory magnetic characteristics can be obtained.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

A multilayer magnetic sheet 400 according to one embodiment of the present disclosure will be described with reference to FIGS. 1 to 13. The multilayer magnetic sheet 400 is used for a contactless-type charging device. The multilayer magnetic sheet 400 may be used in a power feeder of a charging device or may be used in a power receiver.

In the present embodiment, as an example, a multilayer magnetic sheet 400 is used for contactless charging of a device that consumes more power than an information processing device such as a smartphone or an electronic device. For example, the multilayer magnetic sheet 400 is used for contactless charging of a moving body such as an automobile. Note that the multilayer magnetic sheet 400 may be used for contactless charging of an information processing device, an electronic device, or the like. The multilayer magnetic sheet 400 is also applicable to a transport vehicle such as a forklift and an AGV, a railway, a tram, or the like.

Figure 1:
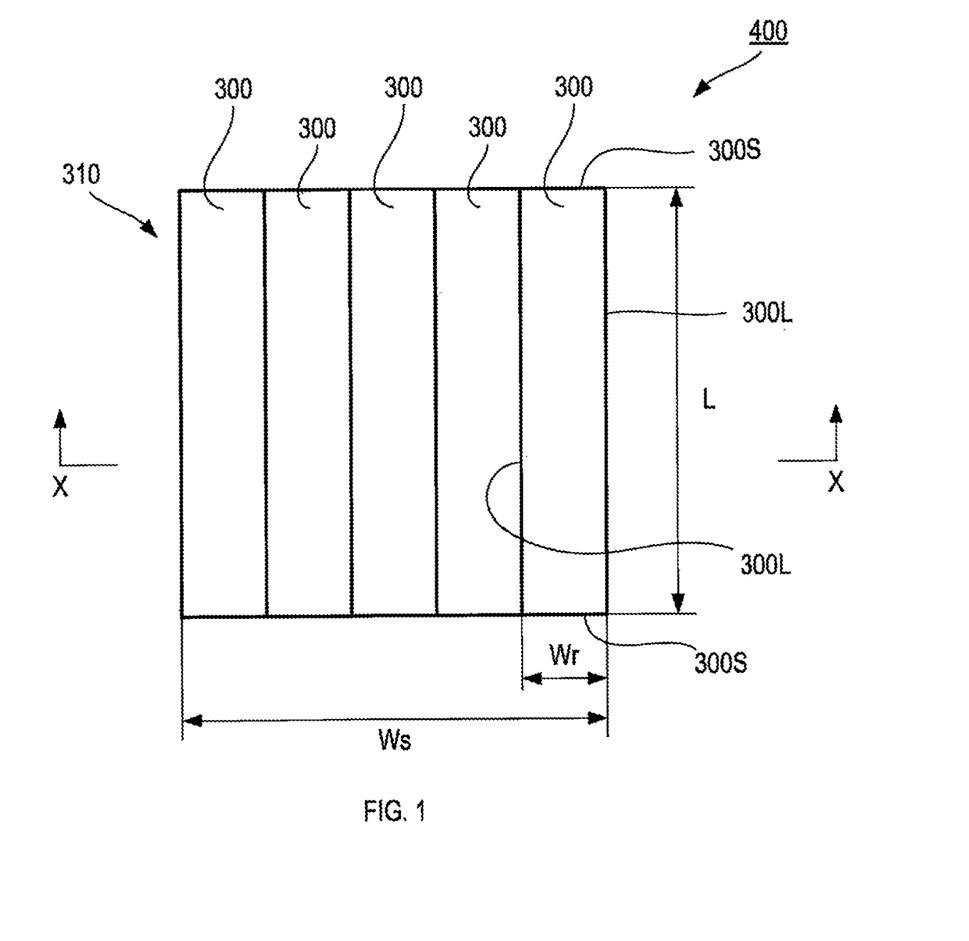
FIG. 1 is a plan view for explaining a structure of a multilayer magnetic sheet according to the present disclosure.
Figure 6:
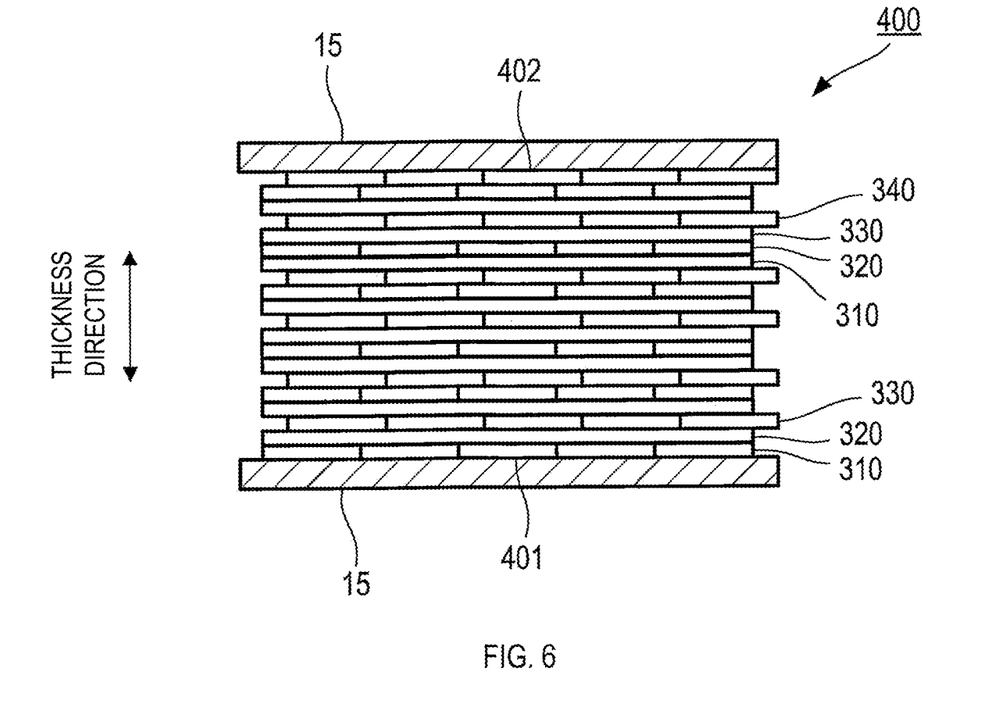
FIG. 6 is a cross-sectional view for explaining the structure of the multilayer magnetic sheet.

FIG. 1 is a plan view for explaining the structure of the multilayer magnetic sheet 400. FIG. 6 is a cross-sectional view for explaining the structure of the multilayer magnetic sheet 400.

In the multilayer magnetic sheet 400, as shown in FIGS. 1 and 6, a large number of layers in each of which a plurality of magnetic strips 300 formed in a band shape are arranged side by side in a plate shape are stacked. The multilayer magnetic sheet 400 includes one or more of each of first layer 310, second layer 320, and third layer 330 described below.

Figure 2A:
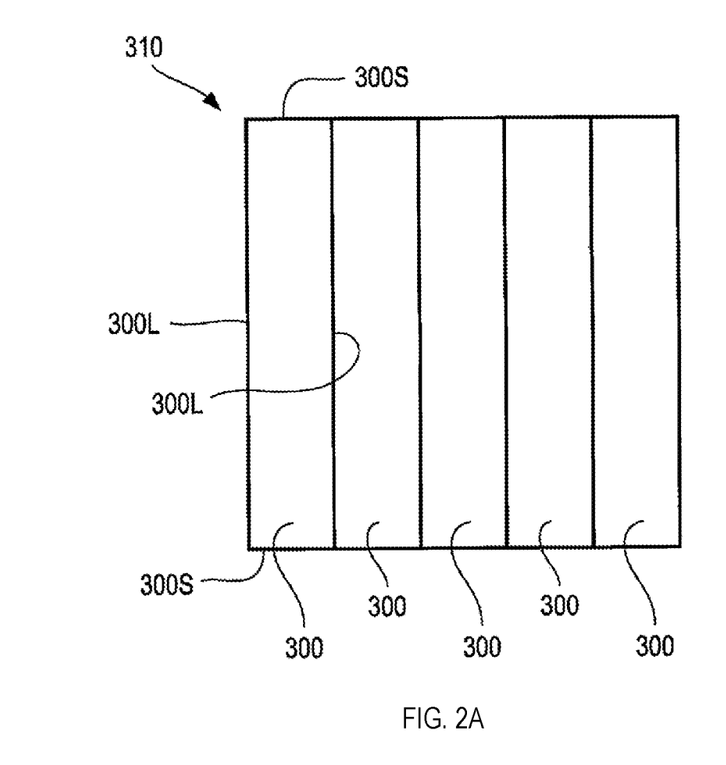
FIG. 2A is a plan view for explaining a structure of a first layer in a multilayer magnetic sheet.

As shown in FIG. 2A, the first layer 310 includes a plurality of magnetic strips 300 formed in a band shape having a short side and a long side. The plurality of magnetic strips 300 are arranged such that long sides 300L are adjacent to each other to be arranged in a plate shape.

Figure 2B:
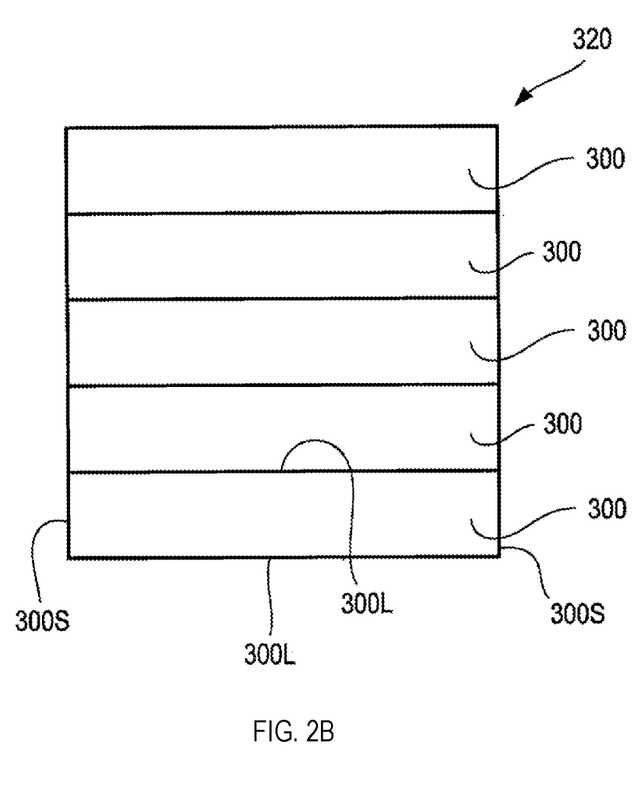
FIG. 2B is a plan view for explaining a structure of a second layer in the multilayer magnetic sheet.

As shown in FIG. 2B, the second layer 320 includes a plurality of magnetic strips 300 formed in a band shape having a short side and a long side. The plurality of magnetic strips 300 are arranged such that long sides 300L are adjacent to each other to be arranged in a plate shape. The direction in which the long side 300L of the second layer 320 extends intersects the direction in which the long side 300L of the first layer 310 extends.

Figure 3:
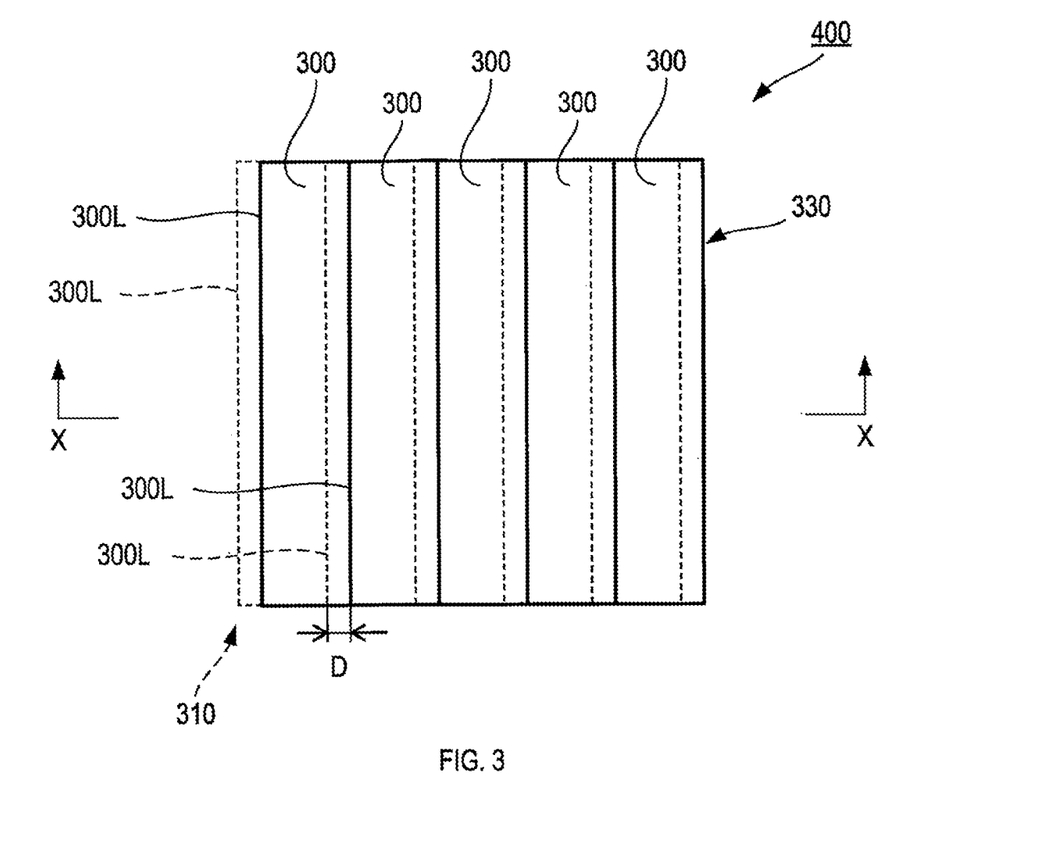
FIG. 3 is a plan view for explaining the structure of the multilayer magnetic sheet.

As shown in FIG. 3, the third layer 330 includes a plurality of magnetic strips 300 formed in a band shape having a short side and a long side. The plurality of magnetic strips 300 are arranged such that long sides 300L are adjacent to each other to be arranged in a plate shape. The direction in which the long side of the third layer 330 extends is the same as the direction in which the long side 300L of the first layer 310 (indicated by a broken line in the drawing) extends.

Figure 4:
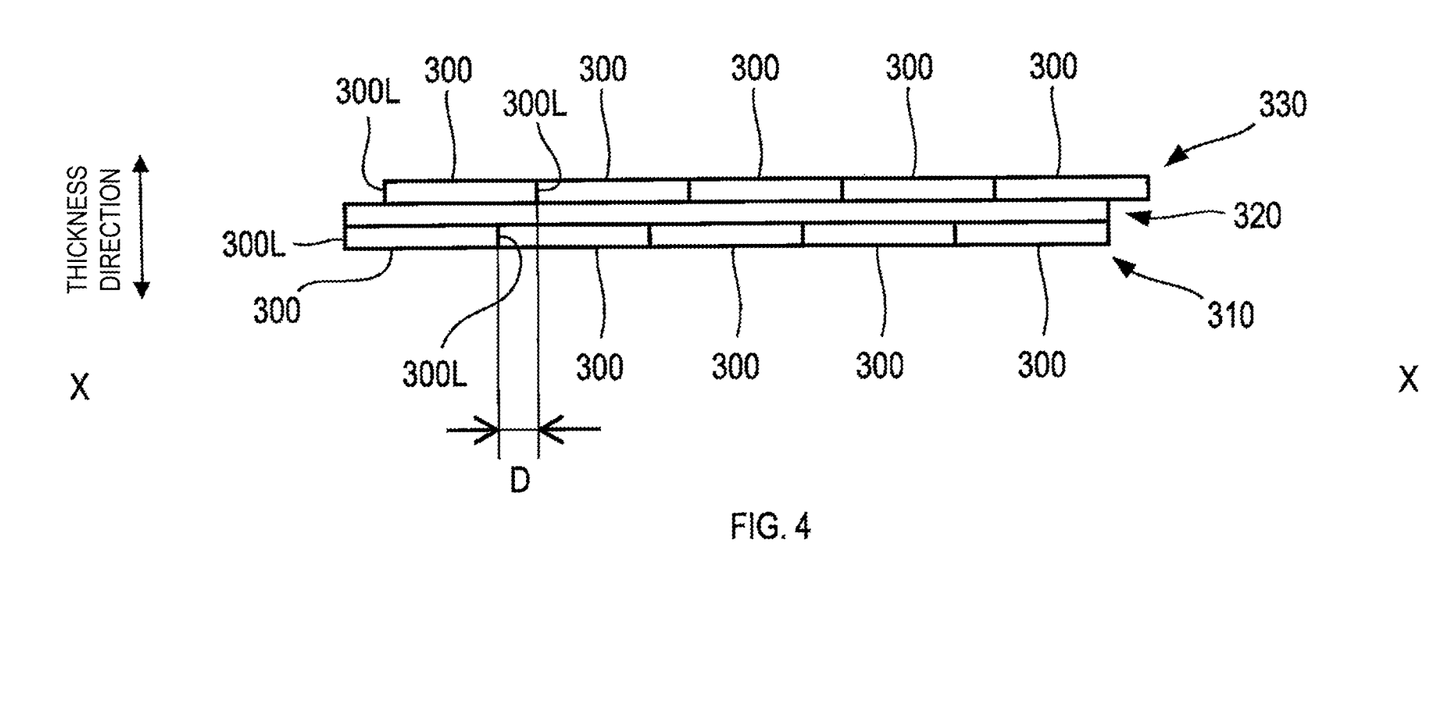
FIG. 4 is a partial cross-sectional view for explaining the structure of the multilayer magnetic sheet.

Furthermore, the position of the long side 300L in the first layer 310 and the position of the long side 300L in the third layer 330 are separated by 0.5 mm or more in the direction in which the short side extends. The distance of the separation is indicated by D. Note that a partial cross-sectional view for explaining the structures of the first layer 310 and the third layer 330 is shown in FIG. 4. FIG. 4 shows an example in which the second layer 320 is provided between the first layer 310 and the third layer 330.

The multilayer magnetic sheet 400 may include one or more fourth layers 340 described below.

Figure 5:
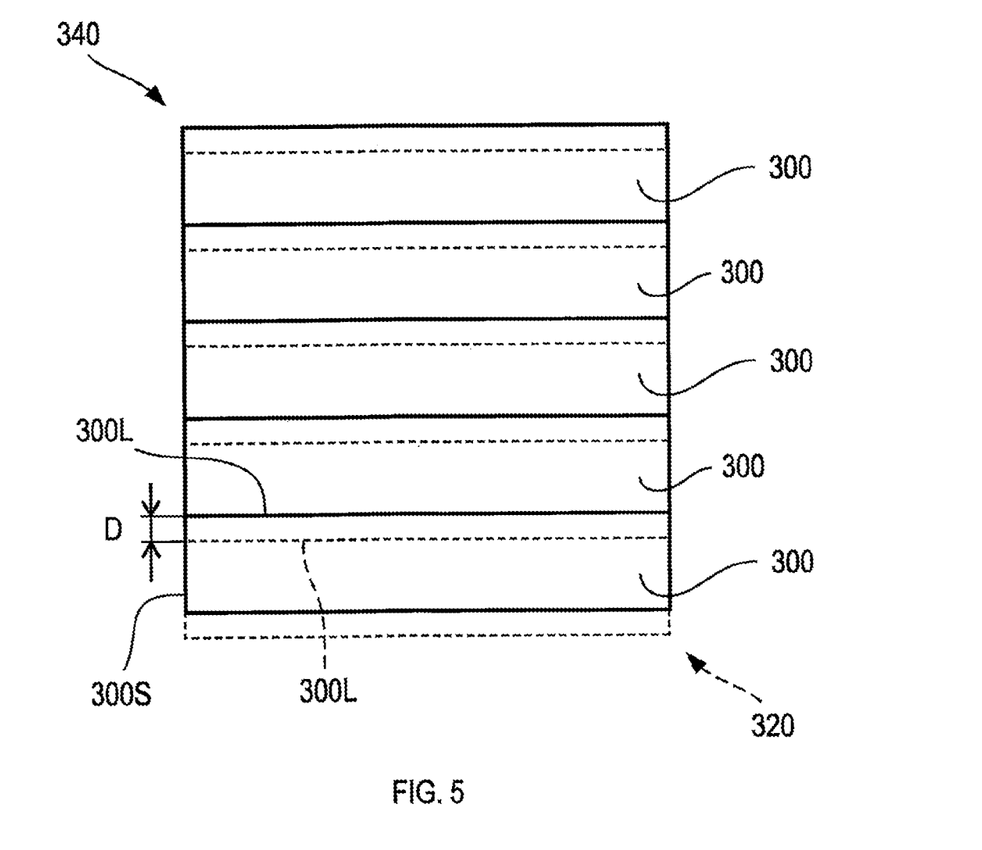
FIG. 5 is a plan view for explaining the structure of the multilayer magnetic sheet.

As shown in FIG. 5, the fourth layer 340 includes a plurality of magnetic strips 300 formed in a band shape having a short side and a long side. The plurality of magnetic strips 300 are arranged such that long sides are adjacent to each other to be arranged in a plate shape. The direction in which the long side 300L of the fourth layer 340 extends is the same as the direction in which the long side 300L of the second layer 320 (indicated by a broken line in the drawing) extends.

Furthermore, the position of the long side 300L in the second layer 320 and the position of the long side 300L in the fourth layer 340 are separated by 0.5 mm or more in the direction in which the short side extends. The distance of the separation is indicated by D.

By adopting a structure including one or more of each of the first layer 310, the second layer 320, and the third layer 330, a magnetic gap continuous in the stacking direction of the magnetic strips 300 can be suppressed from being formed.

In addition, by adopting a structure including one or more of each of the first layer 310, the second layer 320, the third layer 330, and the fourth layer 340, a magnetic gap continuous in the stacking direction of the magnetic strips 300 can be suppressed from being formed.

The order in which the first layer 310 to the third layer 330 are arranged or the order in which the first layer 310 to the fourth layer 340 are arranged can be appropriately set, and the number of each of the layers to be used can also be appropriately set.

The thickness direction is also referred to as "a direction in which the first layer 310, the second layer 320, and the third layer 330 are stacked".

As shown in FIG. 1, the multilayer magnetic sheet 400 has a plate shape or a sheet shape formed in a rectangular shape in a plan view. The plurality of magnetic strips 300 constituting the first layer 310, the second layer 320, the third layer 330, and the fourth layer 340 are arranged such that the long sides 300L are adjacent to each other, and are arranged side by side in the direction in which the short sides 300S extend. The interval between the magnetic strips 300 arranged side by side in the direction in which the short sides 300S extend is preferably 0 mm or more and 5 mm or less.

The number of arranged short sides 300S of the magnetic strips 300 constituting each layer in the extending direction is preferably 2 or more and 20 or less. The number may be 20 or more. In the present embodiment, as an example, five magnetic strips 300 are arranged.

In the present embodiment, as an example, one magnetic strip 300 is arranged in the direction in which the long side 300L extends. Note that a plurality of magnetic strips 300 may be arranged in the direction in which the long side 300L extends.

In the present embodiment, as an example, a length L of the magnetic strip 300 in the direction in which the long side 300L extends is in the range of 100 mm or more and 1000 mm or less, and a width Wr in the direction in which the short side 300S extends is in the range of 10 mm or more and 100 mm or less. Note that the length L of the magnetic strip 300 in the direction in which the long side 300L extends may be outside the range described above, and the width Wr in the direction in which the short side 300S extends may be outside the range described above.

In the present embodiment, as an example, the length L of the multilayer magnetic sheet 400 is in the range of 100 mm or more and 1000 mm or less, and the width Ws is in a range of 100 mm or more and 1000 mm or less.

Here, the length L is a dimension in a direction in which the long side 300L of the magnetic strip 300 in the first layer 310 constituting the multilayer magnetic sheet 400 extends, and the width Ws is a dimension in a direction in which the short side 300S of the magnetic strip 300 in the first layer 310 extends. Note that the length L of the multilayer magnetic sheet 400 may be outside the range described above, and the width Ws may be outside the range described above.

In the multilayer magnetic sheet 400 of the present disclosure, for example, the magnetic strips 300 are arranged with the positions of the long sides 300L shifted as with the first layer 310 and the third layer 330. Therefore, when the magnetic strips 300 having the same dimensions are used, the end faces of the magnetic strips 300 are not aligned on the end face side of the multilayer magnetic sheet 400. As thus described, the end faces of the magnetic strips 300 may not be aligned.

The magnetic strips 300 having different dimensions (dimensions in the width direction) may be used, and the end faces of the magnetic strips 300 may be aligned on the end face side of the multilayer magnetic sheet 400.

As shown in FIG. 6, the multilayer magnetic sheet 400 has a configuration in which the first layer 310 to the third layer 330 are stacked in the thickness direction in a cross-sectional view. In addition, the multilayer magnetic sheet 400 has a configuration in which the first layer 310 to the fourth layer 340 are stacked in the thickness direction. Note that the multilayer magnetic sheet 400 may include a layer having a configuration other than the first layer 310 to the fourth layer 340.

The multilayer magnetic sheet 400 shown in FIG. 6 is provided with a resin sheet 15.

The resin sheet 15 may not be stacked on a first stacking end 401 or a second stacking end 402. In the first stacking end 401 or the second stacking end 402, the magnetic strip 300 may be exposed, or for example, an outer layer material selected from an amorphous alloy strip, a nanocrystalline alloy strip, another magnetic material or a metal foil such as aluminum, a resin sheet, or the like may be attached.

The number of magnetic strips stacked in the thickness direction in the multilayer magnetic sheet 400 is preferably 10 or more in total. The number is preferably 15 or more, more preferably 20 or more, and still more preferably 25 or more. The upper limit of the number of magnetic strips is not particularly set. A required number of layers may be stacked. For example, 200 or less is preferable.

The first layer 310 and the second layer 320 are stacked such that the direction in which the long side 300L of the first layer 310 extends and the direction in which the long side 300L of the second layer 320 extends intersect each other. More preferably, the intersecting angle is 90±1 degrees.

The first layer 310 and the fourth layer 340, the third layer 330 and the second layer 320, and the third layer 330 and the fourth layer 340 are also stacked so as to intersect each other in the same manner. More preferably, the intersecting angle is 90±1 degrees.

As a material for forming the magnetic strip 300, an alloy with an alloy composition of an Fe-based or Co-based alloy can be used, and a nanocrystalline alloy or an amorphous alloy can be used. In particular, the magnetic strip 300 is preferably a strip formed using a nanocrystal alloy as a material (hereinafter also referred to as a "nanocrystalline alloy strip").

The nanocrystalline alloy strip is obtained by subjecting an amorphous alloy strip capable of nanocrystallization to a heat treatment for nanocrystallization. It is preferable to perform heat treatment for nanocrystallization in a state where tension is applied to the amorphous alloy strip capable of nanocrystallization. Note that the strip formed using an amorphous alloy as a material is also referred to as an "amorphous alloy strip" or a "non-crystalline alloy strip".

The nanocrystalline alloy strip preferably has a composition represented by the following general formula.

General Formula: $(Fe_{1-a}Ma)_{100-x-y-z-\alpha-\beta-\gamma}Cu_xSi_yB_zM'_\alpha M''_\beta X_\gamma$ (atomic percent)

In the above general formula, M is Co and/or Ni, M' is at least one element selected from the group consisting of Nb, Mo, Ta, Ti, Zr, Hf, V, Cr, Mn, and W, M" is at least one element selected from the group consisting of Al, a platinum group element, Sc, a rare earth element, Zn, Sn, and Re, X is at least one element selected from the group consisting of C, Ge, P, Ga, Sb, In, Be, and As, and a, x, y, z, α, β, and γ satisfy $0 \le a \le 0.5$, $0.1 \le x \le 3$, $0 \le y \le 30$, $0 \le z \le 25$, $5 \le y+z \le 30$, $0 \le \alpha \le 20$, $0 \le \beta \le 20$, and $0 \le \gamma \le 20$, respectively.

Preferably, in the general formula, a, x, y, z, α, β, and γ satisfy $0 \le a \le 0.1$, $0.7 \le x \le 1.3$, $12 \le y \le 17$, $5 \le z \le 10$, $1.5 \le \alpha \le 5$, $0 \le \beta \le 1$, and $0 \le \gamma \le 1$, respectively.

In the present embodiment, as an example, the magnetic strip 300 is a strip (FT-3 manufactured by Hitachi Metals, Ltd. (now, Proterial, Ltd.)) that is a Fe—Cu—Nb—Si—B based nanocrystal alloy. Note that the magnetic strip 300 may be a nanocrystalline alloy strip having another composition represented by the above general formula or may be an amorphous alloy strip.

When the magnetic strip 300 is a nanocrystalline alloy strip, the magnetic strip 300 is mechanically more brittle than when the magnetic strip is an amorphous alloy strip. When the magnetic strip 300 is a nanocrystalline alloy strip, the crack 21 can be formed with a small external force at the time of directly applying an external force to the magnetic strip 300 to form the crack 21.

When the magnetic strip 300 is a nanocrystalline alloy strip, the crack 21 can be formed without substantially forming unevenness on the surface of the magnetic strip 300. Thus, the planar state of the magnetic strip 300 can be made favorable. The temporal change in the shape of the magnetic strip 300, generated after the magnetic strip 300 and an adhesive layer 10 are attached to each other, is reduced. The temporal change in the magnetic characteristics of the magnetic strip 300 can be suppressed.

As the magnetic strip 300, for example, an alloy strip, manufactured by roll rapid cooling and having a thickness of 100 μm or less can be used. The thickness of the magnetic strip 300 is preferably 50 μm or less, more preferably 30 μm or less, particularly preferably 25 μm or less, and particularly preferably 20 μm or less. Since it is difficult to handle the magnetic strip 300 when the thickness is thin, the thickness of the magnetic strip 300 is preferably 5 μm or more, and more preferably 10 μm or more.

In the multilayer magnetic sheet 400, the magnetic strips 300 are stacked and bonded to each other.

In the multilayer magnetic sheet 400 of the present disclosure, it is preferable to use, as the magnetic strip 300, a magnetic sheet 100 described later in which an adhesive layer 10 is formed on one surface of the magnetic strip 300. The magnetic sheet 100 includes the adhesive layer 10 and can be bonded with another magnetic strip 300, and the magnetic strips 300 can be easily stacked and bonded.

Figure 12:
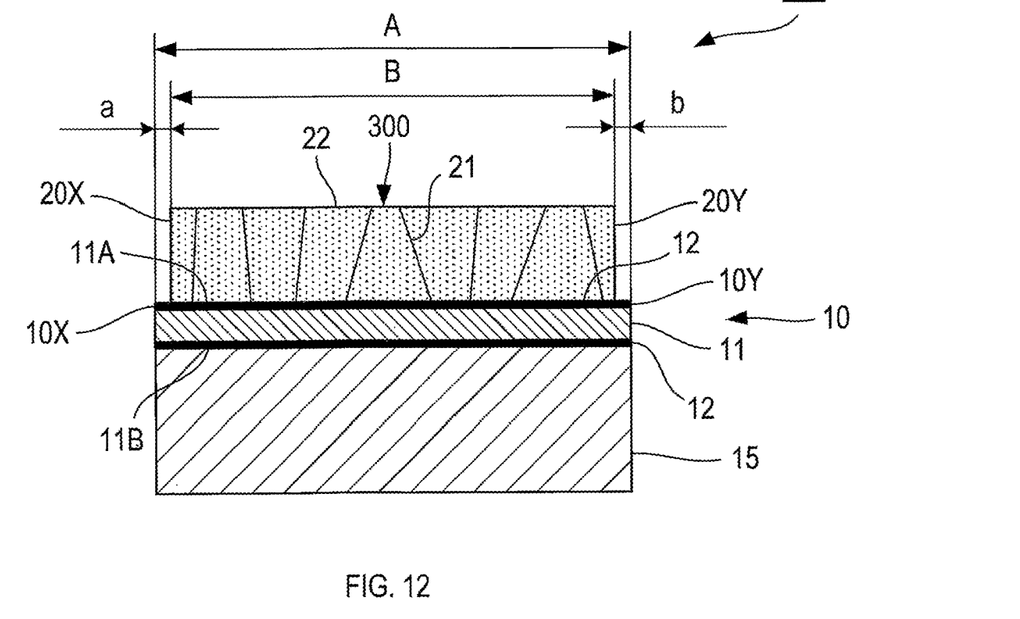
FIG. 12 is a cross-sectional view for explaining a state in which a crack has been formed in a magnetic strip by a crack roll.

FIG. 12 is a cross-sectional view of the magnetic sheet 100 cut in the width direction for explaining the structure of the magnetic sheet 100.

The magnetic sheet 100 can be used as the magnetic strip 300 in the structure described above. As shown in FIG. 12, the magnetic sheet 100 has a configuration in which one adhesive layer 10, one resin sheet 15, and one magnetic strip 300 are stacked. When the magnetic strips 300 are stacked, the resin sheet 15 may be peeled off from the magnetic sheet 100, and another magnetic strip 300 may be bonded to the adhesive layer 10.

The adhesive layer 10 is a member to which the magnetic strip 300 is attached. Furthermore, the adhesive layer 10 is a member formed in an elongated shape, for example, a film-like member formed in a rectangular shape. The adhesive layer 10 is mainly provided with a support 11 and an adhesive 12.

The support 11 is a band-shaped film member formed in an elongated shape, for example, a film member formed in a rectangular shape. The support 11 is formed using a flexible resin material. As the resin material, polyethylene terephthalate (PET) can be used.

The adhesive 12 is provided in a film form or a layer form on each of a first surface 11A and a second surface 11B of the support 11.

As the adhesive 12, for example, a pressure sensitive adhesive can be used. For example, a known adhesive such as an acrylic adhesive, a silicone-based adhesive, a urethane-based adhesive, a synthetic rubber, or a natural rubber can be used as the adhesive 12. The acrylic adhesive is preferable as the adhesive 12 because acrylic adhesive is excellent in heat resistance and moisture resistance and has a wide range of materials that can be bonded.

The adhesive 12 is provided in a layer form on each of the first surface 11A and the second surface 11B of the support 11. In the present embodiment, as an example, the adhesive 12 is provided on the entire surfaces of the first surface 11A and the second surface 11B of the support 11.

The magnetic strip 300 is a strip formed in an elongated band shape using a magnetic material. A crack 21 is formed in the magnetic strip 300. The magnetic strip 300 is divided into a plurality of small pieces 22 by the crack 21. In other words, the magnetic strip 300 includes a plurality of small pieces 22. The crack 21 refers to a magnetic gap formed in the magnetic strip 300 and includes, for example, a break and/or a fissure of the magnetic strip 300.

By forming the crack 21 in the magnetic strip 300, the Q factor can be easily improved when the multilayer magnetic sheet 400 is used as a magnetic body for an inductor. When the multilayer magnetic sheet 400 is used as a magnetic body for magnetic shielding, the eddy current loss can be easily reduced by dividing the current path of the magnetic strip 300.

The magnetic strip 300 is bonded to the adhesive 12 of the adhesive layer 10. In the present embodiment, the magnetic strip 300 is bonded to the adhesive 12 provided on the first surface 11A of the adhesive layer 10. The magnetic strip 300 and the adhesive layer 10 preferably have shapes that satisfy the relationship of the following formula.

$$0.2 \text{ mm} \leq (\text{width } A - \text{width } B) \leq 3 \text{ mm}$$

The width A is a dimension related to the adhesive layer 10, and more preferably a dimension related to a region provided with the adhesive 12 to which the magnetic strip 300 is bonded in the adhesive layer 10. The width B is a dimension related to the magnetic strip 300. When the adhesive 12 is provided on the entire surface of the support 11 of the adhesive layer 10, the width A is a dimension related to the adhesive layer 10 or the support 11.

Here, the lower limit of (width A−width B) is preferably 0.5 mm, and more preferably 1.0 mm. The upper limit of (width A−width B) is preferably 2.5 mm and more preferably 2.0 mm.

The magnetic strip 300 and the adhesive layer 10 are preferably disposed to satisfy a relationship of another following formula.

$$0 \text{ mm} < \text{gap } a \text{ and } 0 \text{ mm} < \text{gap } b$$

In the magnetic sheet 100 of the present disclosure, the width A of the adhesive layer 10 provided with the adhesive 12 in the adhesive layer 10 is larger than the width B of the magnetic strip 300. At the time of attaching the magnetic strip 300 to the adhesive layer 10, even when meandering occurs in the adhesive layer 10 or the magnetic strip 300, the adhesive 12 of the adhesive layer 10 can be easily disposed on the entire surface of the magnetic strip 300.

By setting the value obtained by subtracting the width B from the width A to 0.2 mm or more, a portion where the adhesive is not disposed on the magnetic strip 300 can be easily prevented from occurring at the time of attaching the magnetic strip 300 to the adhesive layer 10. By setting the value obtained by subtracting the width B from the width A to 3 mm or less, the interval between the magnetic strips 300 can be easily prevented from increasing when the magnetic sheet 100 is disposed as the magnetic strip 300. As a result, when the magnetic sheets 100 are arranged in parallel, the interval (magnetic gap) between the magnetic strips 300 can be easily prevented from increasing.

The gap a and the gap b are distances from the end of the adhesive layer 10 to the end of the magnetic strip 300. Specifically, the gap a is a distance from a first adhesive layer end 10X of the adhesive layer 10 to a first strip end 20X of the magnetic strip 300. The gap b is a distance from a second adhesive layer end 10Y of the adhesive layer 10 to a second strip end 20Y of the magnetic strip 300.

The first strip end 20X is an end of the magnetic strip 300 on the same side as the first adhesive layer end 10X. The second adhesive layer end 10Y is an end of adhesive layer 10 opposite to the first adhesive layer end 10X. The second strip end 20Y is an end of the magnetic strip 300 on the same side as the second adhesive layer end 10Y.

The width A, the width B, the gap a, and the gap b are dimensions in a direction intersecting the longitudinal direction of the magnetic strip 300, more preferably in a direction orthogonal thereto. The longitudinal direction of the magnetic strip 300 and the longitudinal direction of the adhesive layer 10 are the same direction.

As an example, a method of manufacturing the magnetic sheet 100 in a case where the length of the magnetic strip 300 in the longitudinal direction is 20,000 m will be described below. Furthermore, as an example, the width A, which is a dimension related to the adhesive layer 10 or the support 11, is 32 mm, the width B, which is a dimension related to the magnetic strip 300, is 30 mm, and the width A−the width B is 2 mm.

The resin sheet 15 is a film-like member formed using a resin and is a member also referred to as a protective film, a release film, or a liner. The resin sheet 15 is a member used for protecting the magnetic strip 300 and the multilayer magnetic sheet 400.

The resin sheet 15 has a function of preventing an unnecessary increase in the crack 21 to be described later (or a crack connecting a plurality of cracks 21 in a mesh form) due to the application of an unintended external force to the magnetic strip 300. Furthermore, the resin sheet 15 has a function of suppressing the small pieces 22 of the magnetic strip 300 from falling off and a function of suppressing the magnetic strip 300 from rusting.

Moreover, the resin sheet 15 has a function of suppressing the occurrence of unnecessary deformation when the multilayer magnetic sheet 400 is processed into a predetermined shape. The unnecessary deformation is, for example, formation of unevenness on the surface. The resin sheet 15 may be stacked together with the adhesive layer 10 as described above or may be stacked alone.

The resin sheet 15 is preferably a film-like member formed using a resin, and more preferably a member formed using a resin with elasticity. In this case, the generation of unevenness on the surface of the magnetic strip 300 is easily suppressed by the elastic force of the resin sheet 15.

Even when unevenness is generated on the surface of the magnetic strip 300, the unevenness of the magnetic strip 300 tends to be flat due to the elastic force of the resin sheet 15. The planar state of the magnetic strip 300 can be made to a favorable state with few unevenness. The temporal change in the magnetic characteristics of the multilayer magnetic sheet 400 can be easily reduced.

As the resin sheet 15, a resin having a lower limit of a tensile elastic modulus of 0.1 GPa can be used. When the tensile elastic modulus of the resin is 0.1 GPa or more, the above effect can be easily obtained sufficiently. The lower limit of the tensile elastic modulus is preferably 0.5 GPa, and more preferably 1.0 GPa.

The upper limit of the tensile elastic modulus of the resin is preferably 10 GPa. When the upper limit exceeds 10 GPa, the deformation of the alloy strip may be suppressed when the crack 21 to be described later is formed. The upper limit of the tensile elastic modulus is preferably 9 GPa, and more preferably 8 GPa.

The resin sheet 15 preferably has a thickness of 1 μm or more and 100 μm or less. When the thickness of the resin sheet 15 increases, the multilayer magnetic sheet 400 is less likely to be deformed. As a result, it may be difficult to dispose the multilayer magnetic sheet 400 along the curved surface or the bent surface.

When the thickness of the resin sheet 15 is less than 1 μm, the resin sheet 15 is more likely to be deformed. As a result, the handling of the resin sheet 15 becomes difficult, and the function of supporting the magnetic strip 300 by the resin sheet 15 may not be obtained sufficiently. When the resin sheet 15 is a protective film, the strength of the resin sheet 15 becomes weak, and the function of protecting the magnetic strip 300 and the like may not be sufficient.

As the resin of the resin sheet 15, it is possible to use, for example, polyethylene terephthalate (PET), polyimide, polyetherimide, polyethylene naphthalate, polypropylene, polyethylene, polystyrene, polycarbonate, polysulfone, polyetherketone, polyvinyl chloride, polyvinyl alcohol, a fluororesin, an acrylic resin, cellulose, or the like. Polyamide and polyimide are particularly preferable as the resin for forming the resin sheet 15 from the viewpoint of heat resistance and dielectric loss.

Figure 7:
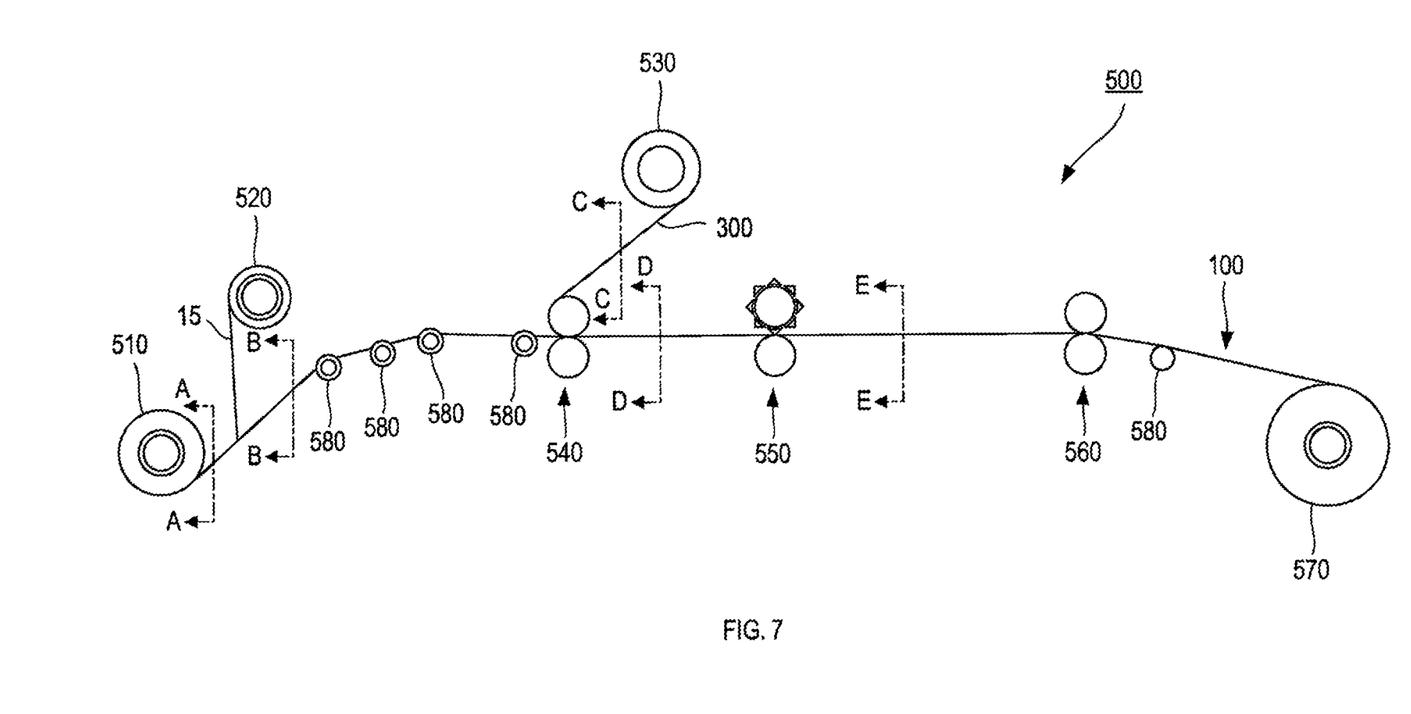
FIG. 7 is a schematic view for explaining a method for manufacturing the magnetic sheet.

FIG. 7 is a schematic view for explaining a method for manufacturing the magnetic sheet 100.

The magnetic sheet 100 can be used as the magnetic strip 300 of the multilayer magnetic sheet 400 described with reference to FIGS. 1 to 6. The magnetic sheet 100 is manufactured using a manufacturing apparatus 500 shown in FIG. 7. The manufacturing apparatus 500 is mainly provided with a first unwinding roll 510, a first winding roll 520, a second unwinding roll 530, an attaching roll 540, a crack roll 550, a flattening roll 560, and a third winding roll 570 from upstream to downstream in the manufacturing process. The manufacturing apparatus 500 may further be provided with a plurality of guide roll 580. Note that the guide roll 580 can be disposed as necessary even at a position not described.

Figure 8:
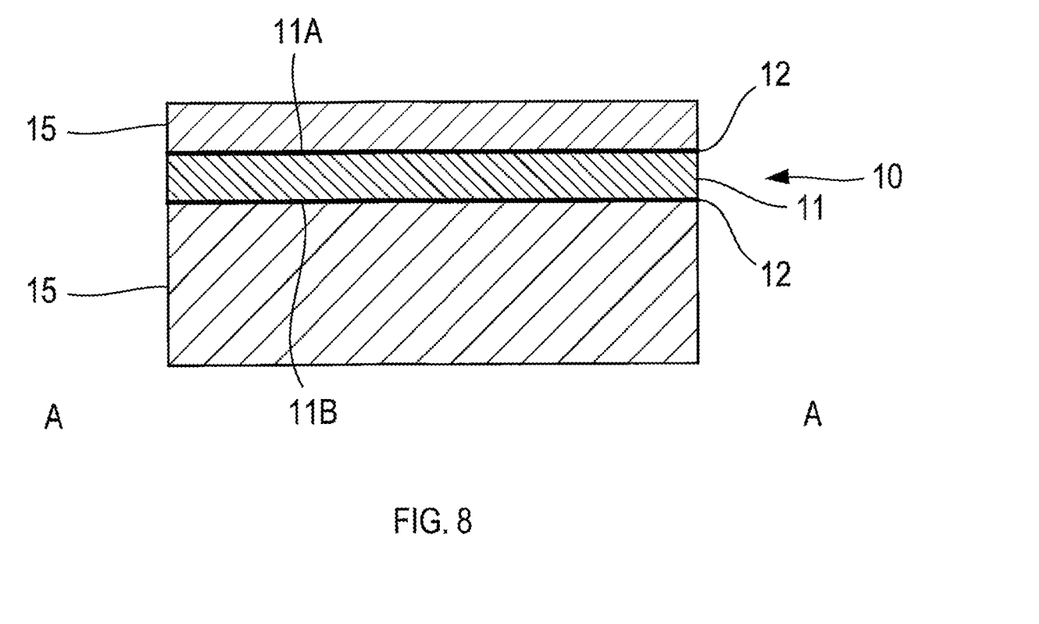
FIG. 8 is a cross-sectional view for explaining a configuration of a laminate supplied from a first unwinding roll.

FIG. 8 is a cross-sectional view for explaining a configuration of a laminate supplied from the first unwinding roll 510.

As shown in FIG. 8, a laminate in which the resin sheet 15 is stacked on the first surface 11A and the second surface 11B of the adhesive layer 10 is wound around the first unwinding roll 510. The resin sheet 15 disposed on the first surface 11A is a protective sheet, and the resin sheet 15 disposed on the second surface 11B is also referred to as a "liner". The resin sheet 15 disposed on the first surface 11A is thinner than the resin sheet 15 disposed on the second surface 11B.

Figure 9:
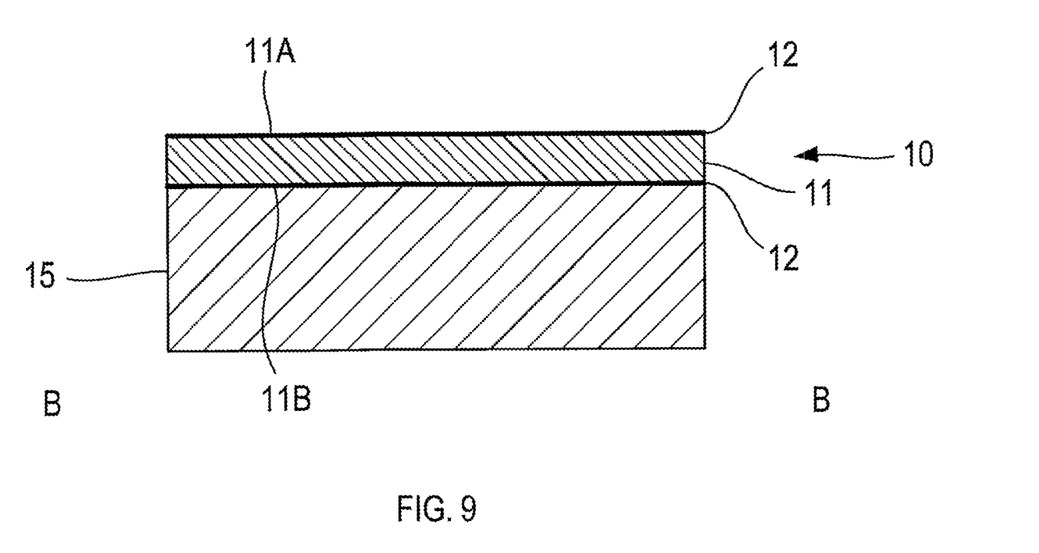
FIG. 9 is a cross-sectional view for explaining a configuration of a laminate supplied from a first unwinding roll, with a resin sheet peeled off.

FIG. 9 is a cross-sectional view for explaining the configuration of the laminate supplied from the first unwinding roll 510 and from which the resin sheet 15 has been peeled off.

As shown in FIG. 9, the resin sheet 15 disposed on the first surface 11A is peeled off from the laminate unwound from the first unwinding roll 510. As shown in FIG. 7, the peeled resin sheet 15 is wound onto the first winding roll 520.

Figure 10:
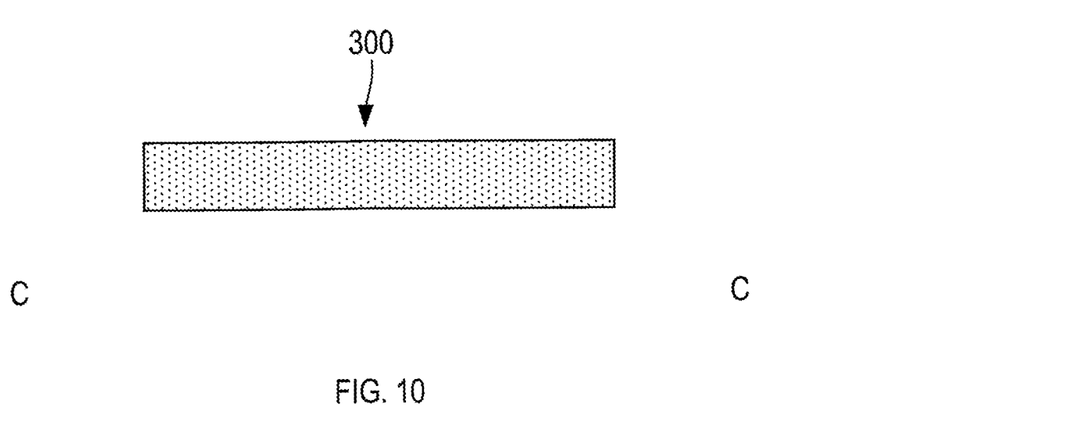
FIG. 10 is a cross-sectional view for explaining a configuration of a magnetic strip supplied from a second unwinding roll.

FIG. 10 is a cross-sectional view for explaining the configuration of the magnetic strip 300 supplied from the second unwinding roll 530.

The laminate from which the resin sheet 15 disposed on the first surface 11A has been peeled off is guided to the attaching roll 540 by the plurality of guide rolls 580. The magnetic strip 300 unwound from the second unwinding roll 530 has further been guided to the attaching roll 540. As shown in FIG. 10, there is no crack 21 formed in the magnetic strip 300 guided to the attaching roll 540.

Here, a method for manufacturing the magnetic strip 300 unwound from the second unwinding roll 530 will be described. For example, a case where the magnetic strip 300 is a nanocrystalline alloy will be described. The magnetic strip 300 is manufactured by a manufacturing method including: a step of rapidly cooling a molten alloy to obtain an amorphous alloy strip capable of nanocrystallization; and a heat treatment step of heat-treating the amorphous alloy strip at a crystallization onset temperature or higher to form fine crystal grains.

The rapid cooling described above is performed by a single roll method in which a molten metal is discharged onto a rotating cooling roll and rapidly cooled and solidified. The magnetic strip 300 has an elongated shape in which a direction along the rotation direction of the cooling roll is a longitudinal direction. The length of the magnetic strip 300 in the longitudinal direction may be, for example, 20,000 m.

The temperature of the heat treatment varies depending on the alloy composition, but is generally 450° C. or higher. The fine crystal grains are, for example, Fe having a body-centered cubic lattice structure with solid solution of Si or the like. The analysis of the fine crystal grains can be performed using X-ray diffraction and a transmission electron microscope.

In the nanocrystalline alloy, at least 50 vol % of the nanocrystalline alloy is occupied by fine crystal grains having an average of the largest dimension of the grain size of 100 nm or less. A portion other than the fine crystal grains in the nanocrystalline alloy is mainly amorphous. The proportion of the fine crystal grains may be substantially 100 vol %.

Figure 11:
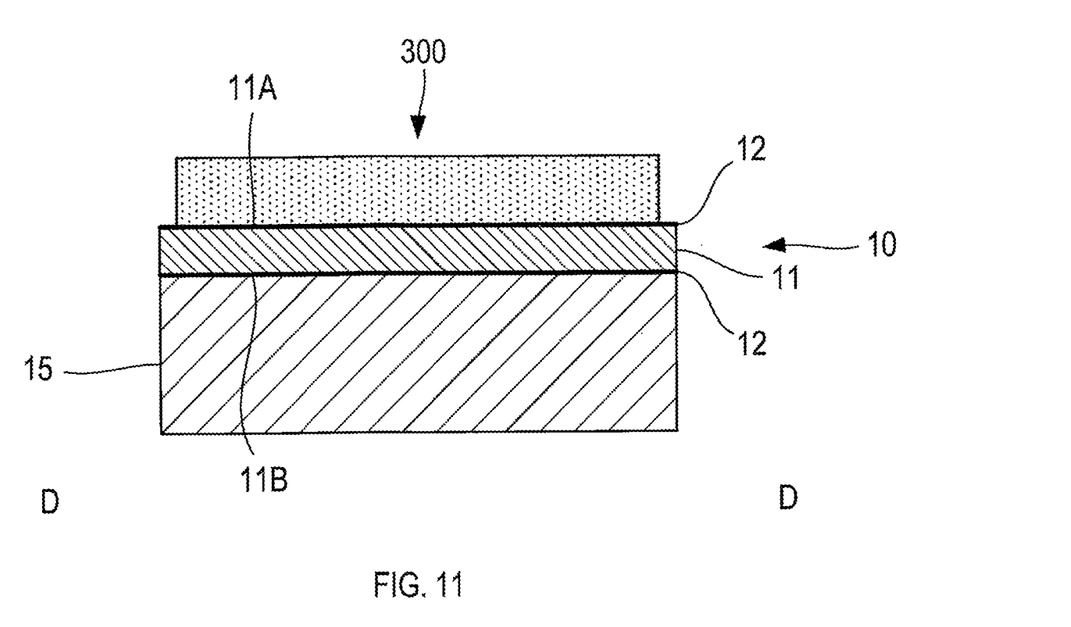
FIG. 11 is a cross-sectional view for explaining a state in which the magnetic strip has been bonded to an adhesive layer by an attaching roll.

FIG. 11 is a cross-sectional view for explaining a state in which the magnetic strip 300 has been bonded to the adhesive layer 10 by the attaching roll 540.

As shown in FIG. 7, the attaching roll 540 presses and bonds the magnetic strip 300 to the laminate from which the resin sheet 15 has been peeled off. Specifically, the laminate and the magnetic strip 300 are guided between two rolls disposed to face each other, and the magnetic strip 300 is pressed against and bonded to the first surface 11A of the adhesive layer 10 using the two rolls as shown in FIG. 11.

The magnetic strip 300 may be disposed such that its center coincides with the center of the adhesive layer 10 in the width direction, or may be disposed such that its center is away from the center of the adhesive layer 10. In this case, the magnetic strip 300 is arranged to satisfy the conditions of 0 mm<gap a and 0 mm<gap b (see FIG. 12). As shown in FIG. 7, the laminate to which the magnetic strip 300 is bonded is guided from the attaching roll 540 to the crack roll 550.

FIG. 12 is a cross-sectional view for explaining a state in which the crack 21 has been formed in the magnetic strip 300 by the crack roll 550.

The crack roll 550 forms the crack 21 in the magnetic strip 300 bonded to the adhesive layer 10. Specifically, a laminate to which the magnetic strip 300 is bonded is guided between two rolls disposed to face each other, and a roll provided with a protrusion among the two rolls is pressed against the magnetic strip 300 to form the crack 21 as shown in FIG. 12.

Among the two rolls, the roll provided with no protrusion is disposed on the side in which the resin sheet 15 has been peeled off in the laminate. The magnetic strip 300 in which the crack 21 is formed includes a plurality of small pieces 22. The plurality of small pieces 22 are bonded to the adhesive layer 10.

Here, the configuration of the crack roll 550 will be described. The crack roll 550 is a roll in which a plurality of convex members are arranged on the peripheral surface. The tip of the end of the convex member of the crack roll 550 may be flat, conical, inverted conical with a recessed center, or cylindrical. The plurality of convex members may be arranged regularly or irregularly.

The long magnetic strip 300 is pressed against the crack roll 550 or the long magnetic strip 300 is caused to pass between the two crack rolls 550 to continuously form the crack 21 in the magnetic strip 300. Further, the convex member of the crack roll 550 is pressed against a plurality of places on the surface of the magnetic strip 300 to form a plurality of cracks 21 in the magnetic strip 300.

In the formation of the crack using the crack roll 550, it is preferable to further form a crack connecting the plurality of cracks 21 in a mesh shape. Specifically, it is preferable to include a step of pressing the crack roll 550 against the magnetic strip 300 to form a plurality of cracks 21 and then forming a crack connecting the plurality of cracks 21 in a mesh shape.

For example, after an external force is directly applied to the magnetic strip 300 by using the crack roll 550 to form the crack 21, a second external force may be applied by means such as curving or winding the magnetic strip 300 to form a crack connecting the plurality of cracks 21 in a mesh form. A crack connecting the cracks 21 (a magnetic gap connecting the cracks) is formed with the cracks 21 as starting points of brittle fracture and/or crack fracture.

In the step of forming a crack connecting the plurality of cracks 21 in a mesh shape, the second external force as described above may not be applied. When the second external force is not applied, a crack connecting the plurality of cracks 21 in a mesh shape is formed in the process of forming the plurality of cracks 21.

The laminate guided from the crack roll 550 to the flattening roll 560 is subjected to a flattening treatment by the flattening roll 560. Note that the flattening roll 560 is also referred to as a shaping roll.

Specifically, the laminate is guided between two rolls disposed opposite to each other in the flattening roll 560, and the laminate is sandwiched and pressed by the two rollers. As a result, the surface of the magnetic strip 300 in which the crack 21 is formed is flattened.

The laminate subjected to the flattening treatment becomes the magnetic sheet 100. The magnetic sheet 100 is guided to the third winding roll 570 via the guide roll 580. The magnetic sheet 100 is wound onto a third winding roll 570.

The magnetic sheet 100 may be cut at a desired length instead of being wound by the third winding roll 570.

The magnetic sheet 100 wound by the third winding roll 570 can be used as the magnetic strip 300 shown in FIGS. 1 to 6. At this time, the magnetic sheet 100 can be cut to a desired length and used. Of course, the cut magnetic sheet 100 may be used instead of the wound magnetic sheet 100.

By using the magnetic sheet 100 as the magnetic strip 300 shown in FIGS. 1 to 6, the magnetic strips 300 (magnetic sheets 100) to be stacked can be easily bonded to each other. It is easier to handle the magnetic strip 300 as the magnetic sheet 100 than to handle the magnetic strip 300 alone. When a nanocrystalline alloy strip is used as the magnetic strip 300, the nanocrystalline alloy strip has a brittle property, and it is not easy to handle the nanocrystalline alloy strip alone.

When the magnetic sheet 100 of the present disclosure is used as the magnetic strip 300 in FIGS. 1 to 6, the magnetic gap between the magnetic strips 300 tends to be larger because a resin layer wider than the magnetic strip 300 is used. However, the present disclosure has a configuration capable of suppressing a deterioration of characteristics due to the magnetic gap between the magnetic strips 300, and even when the magnetic sheet is used as the magnetic strip 300 in FIGS. 1 to 6, a multilayer magnetic sheet with a high magnetic permeability and a high Q factor can be configured.

According to the multilayer magnetic sheet 400 with the above configuration, the magnetic gaps in the stacking direction of the magnetic strip 300 can be suppressed from continuing, and thus a deterioration of the magnetic characteristics in the multilayer magnetic sheet 400 can be easily prevented. As a result, a multilayer magnetic sheet with a high magnetic permeability and a high Q factor can be obtained.

By setting the width of the multilayer magnetic sheet 400 to 100 mm or more and 1000 mm or less and the length to 100 mm or more and 1000 mm or less, the multilayer magnetic sheet 400 can be formed in a desired size.

By making the magnetic strip 300 an amorphous alloy strip or a nanocrystalline alloy strip, the magnetic strip 300 can be made a soft magnetic strip. Also, the magnetic strip 300 can be formed using an alloy.

By including the plurality of small pieces 22 in the magnetic strip 300, the characteristics of the multilayer magnetic sheet 400 can be easily improved. Specifically, when the multilayer magnetic sheet 400 is used as a magnetic body for an inductor, the Q factor can be easily improved. When the multilayer magnetic sheet 400 is used as a magnetic body for magnetic shielding, the eddy current loss can be easily reduced by dividing the current path of the magnetic strip 300.

By providing the adhesive layer 10 on one surface of the magnetic strip 300, the adjacent magnetic strip 300 can be held by the adhesive layer 10. Specifically, the adhesive 12 provided on the first surface 11A of the support 11 is bonded to one of the adjacent magnetic strips 300, and the adhesive 12 provided on the second surface 11B is bonded to the other of the adjacent magnetic strips 300.

By providing the resin sheet 15 at the first stacking end 401 or the second stacking end 402, the manufactured multilayer magnetic sheet 400 can be easily protected. For example, at the time of conveying the manufactured multilayer magnetic sheet 400, the adhesive layer 10 and the magnetic strip 300 can be easily prevented from being damaged.

An outer layer material selected from an amorphous alloy strip, a nanocrystalline alloy strip, another magnetic material, a metal foil such as aluminum, a resin sheet, or the like may be attached to the first stacking end 401 or the second stacking end 402.

The width A of the region of the adhesive layer 10 where the adhesive 12 is provided is larger than the width B of the magnetic strip 300. At the time of attaching the magnetic strip 300 to the adhesive layer 10, even when meandering occurs in the adhesive layer 10 or the magnetic strip 300, the adhesive 12 of the adhesive layer 10 can be easily disposed on the entire surface of the magnetic strip 300.

By setting the value obtained by subtracting the width B from the width A to 0.2 mm or more, a portion where the adhesive 12 is not disposed on the magnetic strip 300 can be easily prevented from occurring at the time of attaching the magnetic strip 300 to the adhesive layer 10. By setting the value obtained by subtracting the width B from the width A to 3 mm or less, it is easy to prevent the portion of the magnetic sheet 100 where the magnetic strip 300 is not disposed from becoming large.

Note that the technical scope of the present disclosure is not limited to the above embodiment, and various modifications can be made without departing from the gist of the present disclosure. For example, the multilayer magnetic sheet 400 according to the present disclosure can be used as an inductive element or the like.

What is claimed is:

1. A multilayer magnetic sheet comprising:
   at least one first layer in which a plurality of magnetic strips each formed in a band shape having a short side and a long side and each provided with, on one surface thereof, an adhesive layer, are arranged such that the long sides are adjacent to each other to be arranged in a plate shape;

at least one second layer in which a plurality of magnetic strips each formed in a band shape having a short side and a long side and each provided with, on one surface thereof, an adhesive layer, are arranged such that the long sides are adjacent to each other to be arranged in a plate shape, a direction in which the long side of the at least one second layer extends intersecting a direction in which the long side of the at least one first layer extends; and at least one third layer in which a plurality of magnetic strips each formed in a band shape having a short side and a long side and each provided with, on one surface thereof, an adhesive layer, are arranged such that the long sides are adjacent to each other to be arranged in a plate shape, a direction in which the long side of the at least one third layer extends being the same as a direction in which the long side of the at least one first layer extends; wherein a position of the long side in the at least one first layer and a position of the long side in the at least one third layer are separated from each other by 0.5 mm or more in a direction in which the short side extends, the adhesive layer includes a support formed in a band shape and an adhesive provided on a first surface and a second surface of the support, on each of the at least one first layer, the at least one second layer, and the at least one third layer, the supports in the adhesive layers are arranged side by side along a direction in which the plurality of magnetic strips is arranged, and a direction in which each of the supports on the at least one first layer extends intersects a direction in which each of the supports on the at least one second layer extends.

2. The multilayer magnetic sheet according to claim 1, further comprising:

at least one fourth layer in which a plurality of magnetic strips each formed in a band shape having a short side and a long side and each provided with, on one surface thereof, an adhesive layer, are arranged such that the long sides are adjacent to each other to be in a plate shape, a direction in which the long side of the at least one fourth layer extends being the same as a direction in which the long side of the at least one second layer extends; wherein a position of the long side in the at least one second layer and a position of the long side in the at least one fourth layer are separated from each other by 0.5 mm or more in a direction in which the short side extends.

3. The multilayer magnetic sheet according to claim 1, wherein the multilayer magnetic sheet has a width of 100 mm or more and 1000 mm or less and a length of 100 mm or more and 1000 mm or less.

4. The multilayer magnetic sheet according to claim 1, wherein each of the plurality of magnetic strips is an amorphous alloy strip or a nanocrystalline alloy strip.

5. The multilayer magnetic sheet according to claim 1, wherein each of the plurality of magnetic strips is a nanocrystalline alloy strip and includes a plurality of small pieces.

6. The multilayer magnetic sheet according to claim 1, wherein when a dimension of the adhesive layer in a direction intersecting a longitudinal direction of the adhesive layer is a width A, and a dimension of each of the plurality of magnetic strips in a direction intersecting a longitudinal direction of each of the plurality of magnetic strips is a width B, a relationship of 0.2 mm≤(width A−width B)≤3 mm is satisfied, and the long side of each of the plurality of magnetic strips is adjacent to the adhesive layer.

7. The multilayer magnetic sheet according to claim 1, wherein in a direction in which the magnetic strips are stacked, the adhesive layer and a resin sheet bonded to the adhesive layer, the resin sheet being a film-shaped member formed using resin, are provided on a magnetic strip, of the plurality of magnetic strips, located at a first stacking end or a magnetic strip, of the plurality of magnetic strips, located at a second stacking end on an opposite side of the first stacking end.

8. A multilayer magnetic sheet comprising:

at least one first layer in which a plurality of magnetic strips each formed in a band shape having a short side and a long side are arranged such that the long sides are adjacent to each other to be arranged in a plate shape;

at least one second layer in which a plurality of magnetic strips each formed in a band shape having a short side and a long side are arranged such that the long sides are adjacent to each other to be arranged in a plate shape, a direction in which the long side of the at least one second layer extends intersecting a direction in which the long side of the at least one first layer extends; and at least one third layer in which a plurality of magnetic strips each formed in a band shape having a short side and a long side are arranged such that the long sides are adjacent to each other to be arranged in a plate shape, a direction in which the long side of the at least one third layer extends being the same as a direction in which the long side of the at least one first layer extends, wherein a position of the long side in the at least one first layer and a position of the long side in the at least one third layer are separated from each other by 0.5 mm or more in a direction in which the short side extends, one surface of each of the plurality of magnetic strips is provided with an adhesive layer, the adhesive layer including a support formed in a band shape and an adhesive provided on a first surface and a second surface of the support, and when a dimension of the adhesive layer in a direction intersecting a longitudinal direction of the adhesive layer is a width A, and a dimension of each of the plurality of magnetic strips in a direction intersecting a longitudinal direction of the magnetic strip is a width B, a relationship of 0.2 mm≤(width A−width B)≤3 mm is satisfied, and the long side of each of the plurality of magnetic strips is adjacent to the adhesive layer.

9. A multilayer magnetic sheet comprising:

at least one first layer in which a plurality of magnetic strips each formed in a band shape having a short side and a long side are arranged such that the long sides are adjacent to each other to be arranged in a plate shape;

at least one second layer in which a plurality of magnetic strips each formed in a band shape having a short side and a long side are arranged such that the long sides are adjacent to each other to be arranged in a plate shape, a direction in which the long side of the at least one second layer extends intersecting a direction in which the long side of the at least one first layer extends; and at least one third layer in which a plurality of magnetic strips each formed in a band shape having a short side and a long side are arranged such that the long sides are adjacent to each other to be arranged in a plate shape, a direction in which the long side of the at least one third layer extends being the same as a direction in which the long side of the at least one first layer extends; wherein a position of the long side in the at least one first layer and a position of the long side in the at least one third layer are separated from each other by 0.5 mm or more in a direction in which the short side extends;

in a direction in which the magnetic strips are stacked, an adhesive layer and a resin sheet bonded to the adhesive layer, the resin sheet being a film-shaped member formed using resin, are provided on a magnetic strip, of the plurality of magnetic strips, located at a first stacking end or a magnetic strip, of the plurality of magnetic strips, located at a second stacking end on an opposite side of the first stacking end; and the adhesive layer includes a support formed in a band shape and an adhesive provided on a first surface and a second surface of the support.

* * * * *